Patented Jan. 15, 1924.

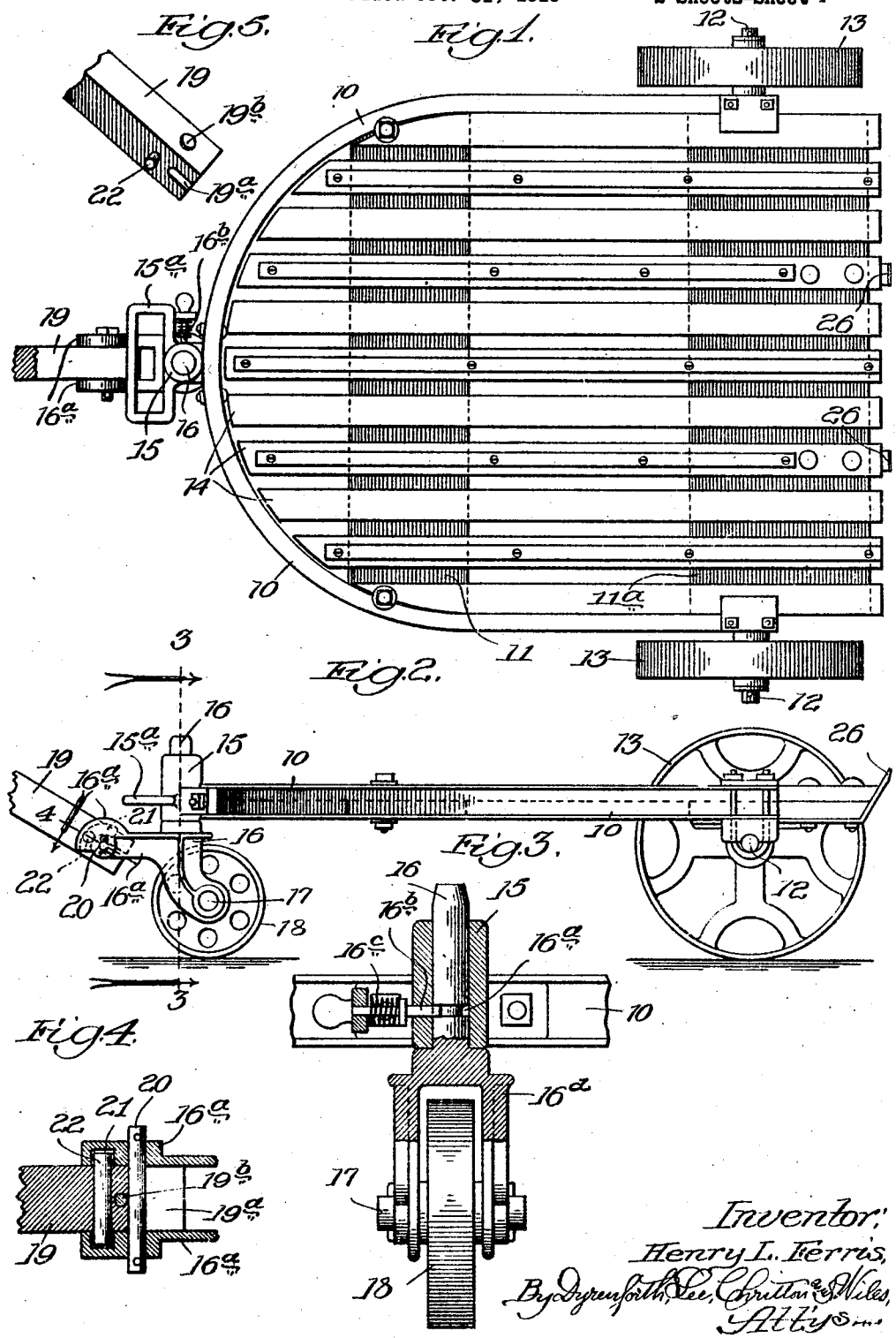

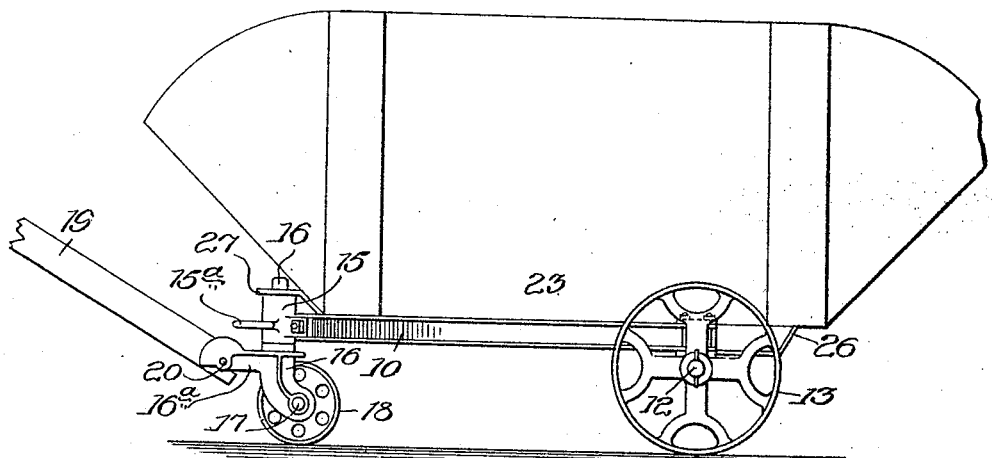
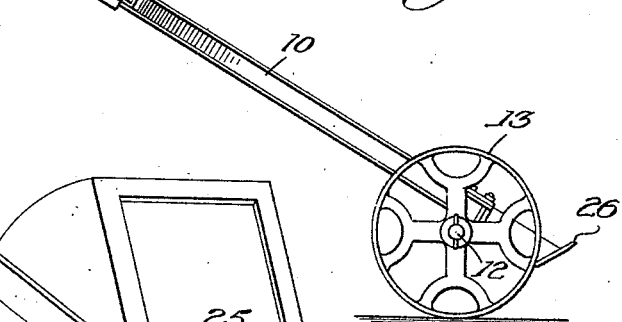
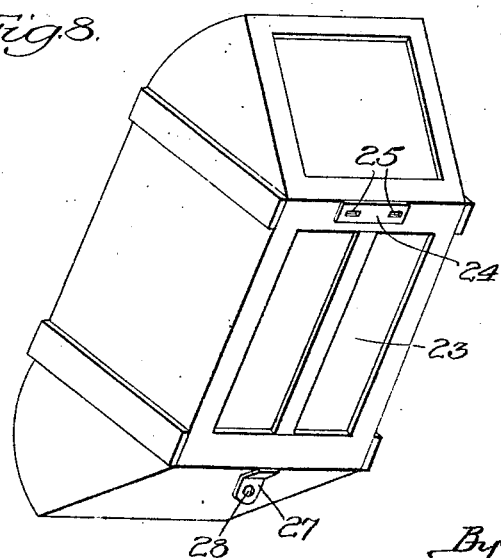

1,481,002

UNITED STATES PATENT OFFICE.

HENRY L. FERRIS, OF HARVARD, ILLINOIS, ASSIGNOR TO HUNT, HELM, FERRIS & CO., A CORPORATION OF ILLINOIS.

TRUCK.

Application filed October 31, 1919. Serial No. 334,766.

*To all whom it may concern:*

Be it known that I, HENRY L. FERRIS, a citizen of the United States, residing at Harvard, in the county of McHenry and State of Illinois, have invented a new and useful Improvement in Trucks, of which the following is a specification.

My invention relates to trucks and is fully described in the following specification and shown in the accompanying drawing in which Figure 1 is a plan view of my truck with the box removed;

Fig. 2 is a side elevation of the same;

Fig. 3 is a partial section on the line 3—3 of Fig. 2;

Fig. 4 is a partial section on the line 4—4 of Fig. 2;

Fig. 5 is partial perspective of the detachable truck handle;

Fig. 6 is a side elevation of the complete truck;

Fig. 7 is a side elevation of the truck with the box and caster wheel removed, and Fig. 8 is a perspective of the bottom of the box.

I have illustrated an embodiment of my invention in a truck consisting preferably of a frame having a U-shaped member 10, to which is secured in any suitable manner a cross member 11 and at its rear end another transverse member 11$^a$ and an axle 12, upon the ends of which are journaled wheels 13. Longitudinally arranged slats 14 are fastened to the cross-members 11 and 11$^a$.

At the forward end of the truck is secured a frame member 15 having a vertical hole therethrough in which is journaled the shaft 16. This shaft carries a castor consisting of a bracket 16$^d$ having bifurcated sides in which are mounted the shaft 17 upon which is journaled the castor wheel 18. The forward extension 16$^a$ of this bracket is bifurcated to receive the truck tongue 19 which is pivotally connected thereto by means of a pin 20 as shown in Figure 4. Inwardly fastening grooves 21 are formed in the extension 16$^a$ which are concentric with the pin 20, and a rocking pin 22 is securely mounted in the tongue 19 and arranged to lie within these concentric grooves. The end of the tongue 19 is slotted at 19$^a$ as shown in Figure 5, and a bolt or shaft 19$^b$ is passed through the truck tongue just back of the pin 22.

It will be apparent from the foregoing description that as the forward end of the truck tongue is depressed the rocking pin 22 will become disengaged from the grooves 21 and the truck tongue may be removed by rolling forward thereon.

The stud shaft 16 is provided with a groove 16$^a$ and a rocking pin 16$^b$ is adapted to engage this groove and is normally pressed thereto by means of a spring 16$^c$. When, therefore, it is desired to remove the castor the pin 16$^b$ is withdrawn and the castor drops away from the truck frame.

When this is done a truck, as shown in Figure 7, is provided which will serve the purposes of what is known as a hand or grain truck and is pushed or rolled about by means of the handle 15$^a$.

Owing to the castoring action of the wheel 18 the truck with the tongue removed may be used as a fuel truck either with or without the box which will now be described.

The box may be of any suitable form, but consists essentially of a flat-bottom 23 having a plate 24 at one end in which are two slots 25 which are adapted to engage fingers 26 at the rear end of the truck body. At the forward end of the box is an ear 27 having a hole 28 which is adapted to register with the upper part of the shaft 16 when the slides 25 are placed over the fingers 26. The box can be removed very easily by raising the forward end. The ear 27 is first disengaged from the shaft 16 and as the box is further raised, the rear end strikes the floor and the plate 24 is raised and the holes 25 are disengaged from the fingers 26.

It will be seen from the foregoing that I have provided a construction which may be converted into a series of trucks which are adapted to many and diversified uses. While I have shown and described but a single embodiment of my invention, numerous modifications are possible. Changes, therefore in the construction and arrangement may be made which do not depart from the spirit and scope of my invention as disclosed in the appended claims in which it is my intention to claim all novelty inherent in my invention as broadly as possible in view of the prior art.

What I claim as new and desire to secure by Letters Patent is:

1. In a truck, a frame, two rear ground engaging wheels carried by said frame, a front wheel carried by a member having a vertical journal in said frame and a removable box hingedly and detachably secured by lugs at the rear end of the frame and having a member engaging said first mentioned member at the front end of the frame.

2. In a truck, a frame, ground engaging wheels carried by said frame, and a removable box hingedly and detachably secured by lugs at the rear end of the frame and having a member engaging an upstanding member at the front end of the frame, said box having an overhanging rear end so that as the front end is raised, the rear end will strike the floor in advance of the frame and raise the box off said lugs, thereby disengaging it from the truck.

3. In a truck, a frame comprising a U-shaped frame member, a floor substantially level with the upper surface of said frame member, axle members at the two upper corners of the U-shaped member, a wheel journalled on each axle member, and a rotatable member vertically journalled at the bottom of said U-shaped member and a wheel horizontally journalled in said rotatable member.

HENRY L. FERRIS.